United States Patent
Byzio et al.

(10) Patent No.: US 7,149,151 B2
(45) Date of Patent: Dec. 12, 2006

(54) ULTRASOUND TRANSDUCER FOR APPLICATION IN EXTREME CLIMATIC CONDITIONS

(75) Inventors: Waldemar Byzio, Friedland (DE); Herbert Windolph, Duderstadt (DE)

(73) Assignee: Adolf Thies GmbH & Co. KG, Gottingen (DE)

( * ) Notice: Subject to any disclaimer, the term of this patent is extended or adjusted under 35 U.S.C. 154(b) by 290 days.

(21) Appl. No.: 10/852,920

(22) Filed: May 25, 2004

(65) Prior Publication Data

US 2005/0022591 A1 Feb. 3, 2005

Related U.S. Application Data

(63) Continuation-in-part of application No. PCT/EP02/13360, filed on Nov. 27, 2002.

(30) Foreign Application Priority Data

Nov. 27, 2001 (DE) .............................. 101 58 144

(51) Int. Cl.
*G01P 5/00* (2006.01)
*H04R 13/00* (2006.01)
*H04R 17/00* (2006.01)

(52) U.S. Cl. ...................................... 367/152

(58) Field of Classification Search ................ 367/152, 367/902; 73/170.13; 381/190
See application file for complete search history.

(56) References Cited

U.S. PATENT DOCUMENTS

| 3,818,425 A | * | 6/1974 | Peynaud et al. ............. 367/902 |
| 4,890,488 A | | 1/1990 | Pincent et al. ................. 73/189 |
| 4,891,796 A | | 1/1990 | Sekine ......................... 367/96 |

FOREIGN PATENT DOCUMENTS

| DE | 3413345 A1 | 10/1984 |
| DE | 19957125 A1 | 6/2001 |
| JP | 62239800 | 10/1987 |
| JP | 08065795 | 3/1996 |
| WO | WO 98/38528 | 9/1998 |

* cited by examiner

*Primary Examiner*—Dan Pihulic
(74) *Attorney, Agent, or Firm*—Thomas, Kayden, Horstemeyer & Risley LLP

(57) ABSTRACT

The invention relates to an ultrasound transducer in particular for application in ultrasound anemometry, comprising an electromechanical transducer (1) with an acoustically active surface, an acoustic matching layer (3) arranged between the acoustic surfaces of the converter and the exposed acoustic surfaces, and an electrical heating element (2). The heating element (2) is arranged between the acoustically active surfaces of the transducer (1) and the matching layer (3).

17 Claims, 1 Drawing Sheet

000# ULTRASOUND TRANSDUCER FOR APPLICATION IN EXTREME CLIMATIC CONDITIONS

CROSS REFERENCE TO RELATED APPLICATIONS

This application is a continuation in part of International Patent Application PCT/EP 02/13360 filed Nov. 27, 2002 and claiming priority to co-pending German Patent Application No. 101 58 144.0-35 filed Nov. 27, 2001 both of which are entitled "Ultraschallwandler für den Einsatz unter extremen klimatischen Bedingungen".

FIELD OF THE INVENTION

The invention relates to an ultrasound transducer for use in the field of metrology, particularly in the field of ultrasound anemometry. Even more particularly, the invention relates to an ultrasound transducer comprising an electro-mechanical transducer having an acoustically active surface, an acoustic matching layer which is arranged in front of the acoustically active surface of the transducer and which provide an exposed acoustic surface, and an electrical heating element.

The ultrasound transducers which are mainly used in the field of metrology belong to the low to medium power range. The acoustic or ultrasound anemometry, i.e. the measurement of wind velocity and direction, poses particularly high requirements on the capability of these ultrasound transducers under all possible climatic conditions.

In ultrasound anemometry but also in measuring distances with ultrasound, an acoustic pulse or wave train is generated at a transmitter site and transformed back into an electrical signal at the receiver site for determining the signal run time.

Some of the requirements which have to be posed on the characteristics and capabilities of ultrasound transducers for outdoor use will be described in the following.

BACKGROUND OF THE INVENTION

The efficiency in transforming the electrical signal into an acoustic signal at the transmitter site and vice versa at the receiver site should remain constant over a wide temperature range.

With resonant ultrasound transducers their frequency of resonance and their radiation behaviour (radiation lobe) should only vary little with changes in temperature or changing masses at the exposed sound transducer surfaces which are due to raindrops, for example. Building-up of ice layers on the exposed ultrasound transducer surfaces under freezing conditions must not result into a breakdown of the system.

As, however, the period in time of such a freezing situation is unknown, building-up of an ice or rime layer has to be avoided for sure, even in case of high wind velocities.

Icing of ultrasound transducers can effectively be avoided, for example, by sufficiently heating them up, if the surface temperature of the acoustically active surface is kept within the positive temperature range (>0° C.).

All known ultrasound transducers have an electromechanical power converter which is based on an piezo-electric or magneto-dynamic effect, i.e. a transducer by which an electric signal can be transformed into a motion (by means of a change in lengths in case of a piezo, for example) and vice versa.

If such a transducer is used without further measures to produce a sound wave in air, coupling the mechanical performance of the solid body of the transducer having a comparatively high acoustic impedance into the air having a very low acoustic impedance is only achieved with high matching losses.

To reduce the matching losses it is known to use $\lambda/4$-layers which are commonly denoted as matching layers and which ideally have an acoustic impedance of the geometric average of the impedances of the solid body of the transducer and of the air.

An optimum impedance match by means of such a matching layer is not possible in practice, as the ideal acoustic impedance mentioned above can not be achieved with any known material or material composition.

The acoustic impedance of a material is the product of the density of the material and of the sound velocity in the material.

This context already indicates that materials or compositions suitable for matching layers normally have a low density.

At the same time, the matching layer must not show a high attenuation of the acoustic wave.

Nearly all materials and material compositions which can be used for matching layers to air only have very low heat conductivity as compared to metals because of their physical properties. The requirements with regard to their acoustic properties are directly opposed to the desired good heat conductivity which is necessary for heating against icing.

PRIOR ART

An ultrasound transducer having a piezoelectric transducer and a matching layer is known from German Patent Application published as DE 199 57 125 A1. This ultrasound transducer is used for determining the distance of objects according to the echo runtime method.

From U.S. Pat. No. 4,891,796, on the one hand, an ultrasound transmitter and receiver unit is known in which electrically conductive and vibration resistant rubber is arranged in the vibrating element and heated up to avoid icing. No details about the place at which the rubber is arranged are given. On the other hand, an ultrasound transmitter and receiver unit is described which is provided with a heating device for avoiding icing which consists of an arrangement of areas of resistance paste having a positive temperature coefficient and extending in a large area underneath a surface towards which the transmitter and the receiver of the unit are exposed.

From U.S. Pat. No. 4,890,488 it is known to fight icing in an ultrasound anemometer by means of heating which is, however, rejected here because of its high energy consumption. Instead, the ultrasound signal used for measuring shall be modified to reduce the influence of icing.

SUMMARY OF THE INVENTION

The invention provides an ultrasound transducer comprising an electro-mechanical transducer having an acoustically active surface, a heating element arranged on the acoustically active surface of the transducer, and an acoustic matching layer which is arranged in front of the acoustically active surface of the transducer on the heating element, and which provides an exposed acoustic surface of the ultrasound transducer.

Particularly, the invention provides an ultrasound transducer for ultrasound anemometry, comprising an electromechanical transducer having an acoustically active surface and a connector electrode at the acoustically active surface covering the acoustically active surface, a first soft solder layer attached to the connector electrode of the transducer, and covering the acoustically active surface of the transducer, a heating element having a back connector electrode and a front connector electrode, and covering the acoustically active surface of the transducer, the back connector electrode being attached to the first soft solder layer, a second soft solder layer attached to the front connector electrode of the heating element in front of the acoustically active surface of the transducer, a metal ring attached to the second soft solder layer in front of the acoustically active surface of the transducer, a ring made of a passively attenuating acoustic material enclosing the metal ring, and an acoustic matching layer which is arranged in front of the acoustically active surface of the transducer within the metal ring, the metal ring providing positive fit and positive centring for the matching layer on the heating element, the acoustic matching layer providing an exposed acoustic surface of the ultrasound transducer.

Thus, the invention provides an ultrasound transducer in which the heating element is particularly effectively integrated.

The problems discussed in the following had to be overcome by inventive efforts:

The matching layer consists of a material composition having low heat conductivity. The heat conductivity had to be increased at least by a factor two by means of amending the material composition but without essentially degrading the acoustic match at the same time.

The heat flow should go an as short way through the matching layer having a low heat conductivity as possible to keep the cooling effect by strong wind as small as possible. The thermal impedance of the matching layer towards the surrounding strongly depends on the flow velocity of the air. Thermal anemometers are based on this effect which is not desired here).

The heating element should preferably keep its temperature constant by itself so that an overheating in cases without cooling by flowing air is securely avoided. (Because of the geometry of the ultrasound transducer it is nearly impossible to build-in a temperature sensor as a sensor for the actual value for temperature control.)

The temperature of the heating element had to be chosen quite high (about 90° C.) because of the still high heat resistance of the matching layer.

At the same time thermal stresses has to be envisaged every time the heating of a cooled-down ultrasound transducer is switched on.

During these process temperature differences of up to 120 Kelvin may occur for short times between the components of the ultrasound transducer.

Because of this reason the selected materials must have about the same temperature coefficient or the layers have to be mechanically anchored in a suitable way to securely avoid destruction by cracking or tear off.

The materials of a piezo-ceramic used as an electroacoustic transducer and of a ceramic-like PTC-resistor used as a heating element do not essentially differ in their thermal coefficient of expansion so that even a two-dimensional soldered joint keeps its full functionality with the geometries given here.

The coefficient of expansion of the matching layer material, however, essentially differs from that one of the material mentioned above (piezo- and PTC-ceramics) so that relevant mechanical stresses will occur at the interfaces between the materials caused by the different operation temperatures to be envisaged.

Any damages to, changes of the properties of, or even a breakdown of the transducer because of these mechanical stresses have to be avoided for sure.

The mass of the acoustic active element of the transducer will be considerably increased by incorporating a heating layer having a low impedance into the acoustic path. Because of this, the sensor keeps oscillating for a considerably longer period of time after transmitter excitation. Thus, the sensor should be passively attenuated by incorporating a suitable material to nevertheless obtain the maximum possible measuring rate for a given measuring path length.

BRIEF DESCRIPTION OF THE DRAWINGS

The invention can be better understood with reference to the following drawing. The components in the drawing are not necessarily to scale, emphasis instead being placed upon clearly illustrating the principles of the present invention.

DESCRIPTION OF A PREFFERED EMBODIMENT OF THE INVENTION

Figure 1:
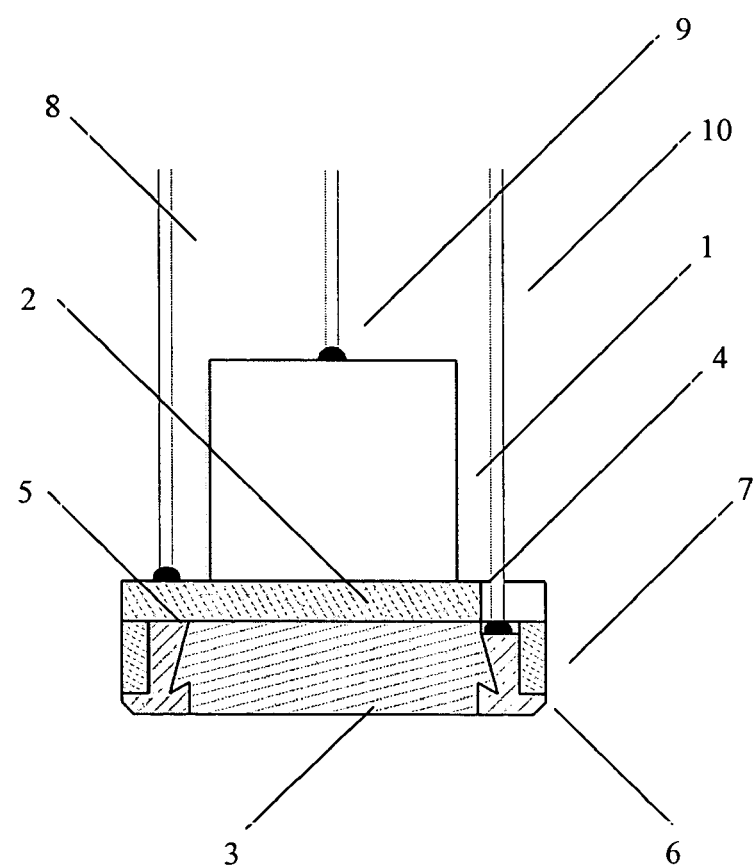
FIG. 1 shows a preferred embodiment of the new ultrasound transducer in a cross section.

Referring now in greater detail to the drawing, the ultrasound transducer shown in FIG. 1 comprises an electromechanical transducer 1 having a piezo-electric or magnetodynamic transducer material and an acoustically active surface. Further, the transducer 1 has a back connector electrode connected to a signal line 9, and a front connector electrode at its acoustically active surface. The transducer is operated by a voltage signal applied to its back electrode via the signal line 9. The front electrode of the transducer 1 is connected to a back connector electrode of a heating element 2 via a soft solder layer. Both, the front electrode of the transducer 1 and the back electrode of the heating element 3 are connected to a ground line 8. The heating element is operated by an electric current flowing from a front connector electrode connected to a heating line 10 to the back electrode connected to the ground line 8. The heating element 2 comprises a PTC-resistance material showing a self control of its temperature by decreasing its electric conductance with increasing temperature. To the end of enhancing the coupling of a sound signal of the transducer into the air surrounding the transducer, an acoustic matching layer 3 which provides an exposed acoustic surface of the ultrasound transducer is arranged in front of the acoustically active surface of the transducer on the heating element. Laterally, the matching layer 3 is enclosed by a metal ring 6 which is also arranged on the heating element 2 and which is connected to the front electrode of the heating element 2 by a further soft solder layer. The metal ring 6 provides positive fit and positive centring for the matching layer 3 on the heating element 3 in front of the acoustically active surface of the transducer 1. A ring 7 made of a passively attenuating acoustic material, such as an elastomeric material, is coaxially arranged on the metal ring 6. The heating element 2 is designed for a heating temperature of 80 to 90° C. effectively avoiding the formation of ice at the exposed surface of the matching layer even with a matching layer having a high thermal impedance. The matching layer 3 is stable and keeps its acoustic properties at least up to this heating temperature.

We claim:

1. An ultrasound transducer comprising:
an electro-mechanical transducer having an acoustically active surface,
a heating element arranged on the acoustically active surface of the transducer, and
an acoustic matching layer which is arranged in front of the acoustically active surface of the transducer on the heating element, and which provides an exposed acoustic surface of the ultrasound transducer.

2. The ultrasound transducer of claim 1, wherein the heating element comprises a PTC-resistance material having a decreasing electric conductance with increasing temperature.

3. An ultrasound transducer comprising:
an electro-mechanical transducer having an acoustically active surface;
a heating element arranged on the acoustically active surface of the transducer; and
an acoustic matching layer which is arranged in front of the acoustically active surface of the transducer on the heating element, and which provides an exposed acoustic surface of the ultrasound transducer, a connector electrode of the transducer being metallically connected over a surface area of the full acoustically active surface of the transducer to a back connector electrode of the heating element.

4. The ultrasound transducer of claim 3, wherein the connector electrodes are connected to each other by a first soft solder layer.

5. The ultrasound transducer of claim 3, wherein the connector electrodes are conjointly connected to ground.

6. An ultrasound transducer comprising:
an electro-mechanical transducer having an acoustically active surface;
a heating element arranged on the acoustically active surface of the transducer;
an acoustic matching layer which is arranged in front of the acoustically active surface of the transducer on the heating element, and which provides an exposed acoustic surface of the ultrasound transducer; and
a metal ring laterally enclosing the matching layer also arranged on the heating element.

7. The ultrasound transducer of claim 6, wherein the metal ring is connected to a front connector electrode of the heating element by means of a second soft solder layer.

8. The ultrasound transducer of claim 6, wherein the metal ring provides positive fit and positive centring for the matching layer.

9. The ultrasound transducer of claim 6, wherein a ring made of a passively attenuating acoustic material encloses the metal ring.

10. The ultrasound transducer of claim 1, wherein the transducer comprises a piezo-electric transducer material.

11. The ultrasound transducer of claim 1, wherein the transducer comprises or magneto-dynamic transducer material.

12. An ultrasound transducer comprising:
an electro-mechanical transducer having an acoustically active surface;
a heating element arranged on the acoustically active surface of the transducer; an acoustic matching layer which is arranged in front of the acoustically active surface of the transducer on the heating element, and which provides an exposed acoustic surface of the ultrasound transducer, wherein the heating element is designed for a heating temperature of 80 to 90° C., and the matching layer is stable and keeps its acoustic properties up to this heating temperature.

13. An ultrasound transducer for ultrasound anemometry, comprising:
an electro-mechanical transducer having an acoustically active surface and a connector electrode at the acoustically active surface covering the acoustically active surface,
a first soft solder layer attached to the connector electrode of the transducer, and covering the acoustically active surface of the transducer,
a heating element having a back connector electrode and a front connector electrode, and covering the acoustically active surface of the transducer, the back connector electrode being attached to the first soft solder layer,
a second soft solder layer attached to the front connector electrode of the heating element in front of the acoustically active surface of the transducer,
a metal ring attached to the second soft solder layer in front of the acoustically active surface of the transducer,
a ring made of a passively attenuating acoustic material enclosing the metal ring, and
an acoustic matching layer which is arranged in front of the acoustically active surface of the transducer within the metal ring, the metal ring providing positive fit and positive centring for the matching layer on the heating element, the acoustic matching layer providing an exposed acoustic surface of the ultrasound transducer.

14. The ultrasound transducer of claim 3, wherein the heating element comprises a PTC-resistance material having a decreasing electric conductance with increasing temperature.

15. The ultrasound transducer of claim 3, wherein the transducer comprises a piezo-electric transducer material.

16. The ultrasound transducer of claim 6, wherein the heating element comprises a PTC-resistance material having a decreasing electric conductance with increasing temperature.

17. The ultrasound transducer of claim 6, wherein the transducer comprises a piezo-electric transducer material.

* * * * *